United States Patent
Hammar et al.

(10) Patent No.: US 10,548,263 B2
(45) Date of Patent: Feb. 4, 2020

(54) BLADE CLUTCH ACTUATOR (BCA) WITH OVERLOAD SLIP CLUTCH

(71) Applicant: McCormick Technical Consulting, LLC, Manchester, MD (US)

(72) Inventors: John A. Hammar, Newtown, CT (US); Gary M. Marcy, Rochester, NY (US); Garrett P. McCormick, Manchester, MD (US)

(73) Assignee: McCormick Technical Consulting, LLC, Manchester, MD (US)

( * ) Notice: Subject to any disclaimer, the term of this patent is extended or adjusted under 35 U.S.C. 154(b) by 176 days.

(21) Appl. No.: 15/833,483

(22) Filed: Dec. 6, 2017

(65) Prior Publication Data

US 2018/0160621 A1 Jun. 14, 2018

Related U.S. Application Data

(60) Provisional application No. 62/431,854, filed on Dec. 9, 2016.

(51) Int. Cl.
| | |
|---|---|
| *A01D 34/68* | (2006.01) |
| *A01D 69/08* | (2006.01) |
| *A01D 34/82* | (2006.01) |
| *F16D 11/14* | (2006.01) |
| *A01D 34/76* | (2006.01) |
| *A01D 69/02* | (2006.01) |
| *F16D 23/12* | (2006.01) |
| *A01D 101/00* | (2006.01) |
| *F16D 121/24* | (2012.01) |
| *F16D 125/28* | (2012.01) |
| *A01D 34/00* | (2006.01) |

(52) U.S. Cl.
CPC ......... *A01D 34/6812* (2013.01); *A01D 34/76* (2013.01); *A01D 34/828* (2013.01); *F16D 11/14* (2013.01); *A01D 34/008* (2013.01); *A01D 69/02* (2013.01); *A01D 69/08* (2013.01); *A01D 2034/6843* (2013.01); *A01D 2101/00* (2013.01); *F16D 2023/123* (2013.01); *F16D 2121/24* (2013.01); *F16D 2125/28* (2013.01)

(58) Field of Classification Search
CPC ........ A01D 34/76; A01D 34/66; A01D 69/08; A01D 34/6812; A01D 34/828; F16H 7/1218; F16H 7/1281; F16H 7/12; F16H 7/1263; F16H 7/1209; F16H 7/1245; F16H 37/124; F01L 1/02; F01L 1/024; F16D 11/14
USPC .......... 56/10.8, 11.3; 474/101, 110, 117, 135
See application file for complete search history.

(56) References Cited

U.S. PATENT DOCUMENTS 3,854,080 A * 12/1974 Bambara ................. G03B 19/18
318/436
4,793,640 A * 12/1988 Stewart, Sr. ............ E05B 81/25
292/199

(Continued)

*Primary Examiner* — Robert E Pezzuto
(74) *Attorney, Agent, or Firm* — Royal W. Craig; Gordon Feinblatt LLC (57) ABSTRACT

An improved electromechanical Blade Clutch Actuator (BCA) that employs an electric gear motor system to provide more economical, convenient and reliable user control with an electric switch to engage/disengage the cutting blades. The user control may be a switch remotely mounted anywhere on the mower for greater design freedom due to the removal of the manual interface. The BCA also incorporates a novel slip clutch for overload protection.

25 Claims, 8 Drawing Sheets

(56) References Cited

U.S. PATENT DOCUMENTS

| | | | | |
|---|---|---|---|---|
| 5,894,397 A * | 4/1999 | Nelson | .................. | H02H 3/046 |
| | | | | 361/104 |
| 5,921,612 A * | 7/1999 | Mizuki | ..................... | B60J 5/12 |
| | | | | 292/341.16 |
| 9,038,563 B1 * | 5/2015 | Steinbring | ............... | B60Q 9/00 |
| | | | | 116/58 A |
| 9,334,932 B2 * | 5/2016 | Antchak | ............... | F16H 7/1263 |
| 9,861,039 B2 | 1/2018 | Jiang et al. | | |
| 2005/0192142 A1 * | 9/2005 | Stone | ...................... | F01L 1/024 |
| | | | | 474/101 |
| 2005/0282668 A1 * | 12/2005 | Ali | ....................... | F16H 7/1218 |
| | | | | 474/101 |
| 2013/0172137 A1 * | 7/2013 | Antchak | ............... | B60K 25/02 |
| | | | | 474/133 |
| 2016/0219788 A1 | 8/2016 | Jiang et al. | | |

* cited by examiner

Cable movement per degree of crank arm rotation

BLADE CLUTCH ACTUATOR (BCA) WITH OVERLOAD SLIP CLUTCH

CROSS-REFERENCE TO RELATED APPLICATION(S)

The present application derives priority from U.S. Provisional Patent Application Ser. No. 62/431,854 filed 9 Dec. 2016.

BACKGROUND OF THE INVENTION

1. Field of the Invention

The present invention relates to residential and commercial lawn mowing equipment and, more particularly, to an electromechanical actuator with overload clutch protection that couples and uncouples the cutting blades to the drive shaft of the mower engine.

2. Description of the Background

Most lawn mowers are gasoline engine powered, and for many residential and most commercial mowers the engine may be used both to propel the vehicle and also to power the cutting blades of the mower deck. For safety and performance, the cutting blades of the mower are required to be engaged and disengaged from the engine with a blade clutch mechanism. Typical blade clutch mechanisms employ either a manual system with a user-operated lever arm connected by a mechanical linkage to the blade clutch actuator mechanism, or an electrically operated electromagnetic clutch that engages/disengages the cutting blades.

Figure 1:
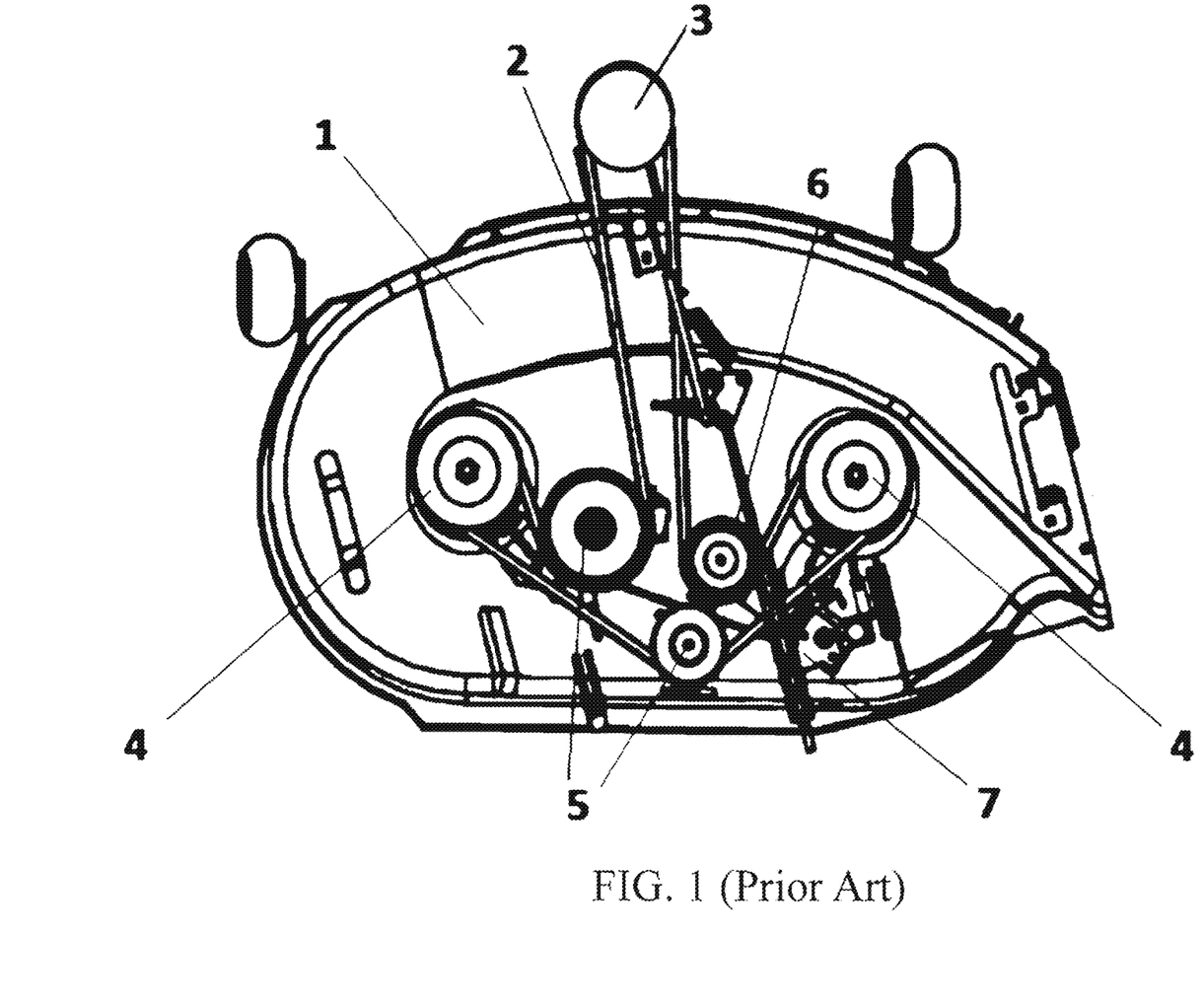
FIG. 1 is a perspective drawing of a typical prior art electromagnetic clutch.

FIG. 1 is a perspective drawing of a typical prior art electromagnetic clutch. Power for the mowing deck 1 is transmitted from the engine by a belt 2 drive system. The belt 2 is driven from a drive pulley 3 connected to the engine. The cutting blade pulleys 4 are connected to the cutting blades through a system of shafts and bearings. Idler pulleys 5 are used to ensure correct belt/pulley wrap to transmit the required torque. The drive belt 2 is held in constant tension by the tensioning pulley 6 by a lever and spring 7. The drive pulley 3 uses an electromagnetic actuated clutch to engage/disengage the pulley from the engine. There are both advantages and disadvantages to the electromagnetic clutch configuration. Some benefits of the electromagnetic clutch are as follows:

the electromagnetic clutch reduces the physical manual movement required to engage manual systems;
a simple electrical switch is used to engage/disengage the cutting blades;
no mechanical linkage is needed to the cutting deck (remote actuation is possible with an electrical switch for reduced design challenges).

Some drawbacks of the electromagnetic clutch are as follows:

the drive belt 2 is in constant tension, which accelerates wear/failure rates of the belt and bearing system;
the electromagnetic clutch requires continuous electrical power while the cutting blades are engaged resulting in continuous electrical power demand;
the electromagnetic clutch actuation (disengaged to engaged) is very fast (on the order of milliseconds). This fast engagement means that the load from the blades is almost instantaneously coupled to the gasoline engine. This abrupt engagement and loading of the belt and engine contributes to accelerated belt wear and shock or impact to the tractor product that will be felt by the user due to the inertia/speed mismatch between the engine drive and the cutting system;
this very abrupt loading of the gasoline engine can be severe enough to stall or almost stall the engine which may drive the designer to oversize the gasoline engine in order to compensate.

Figure 2:
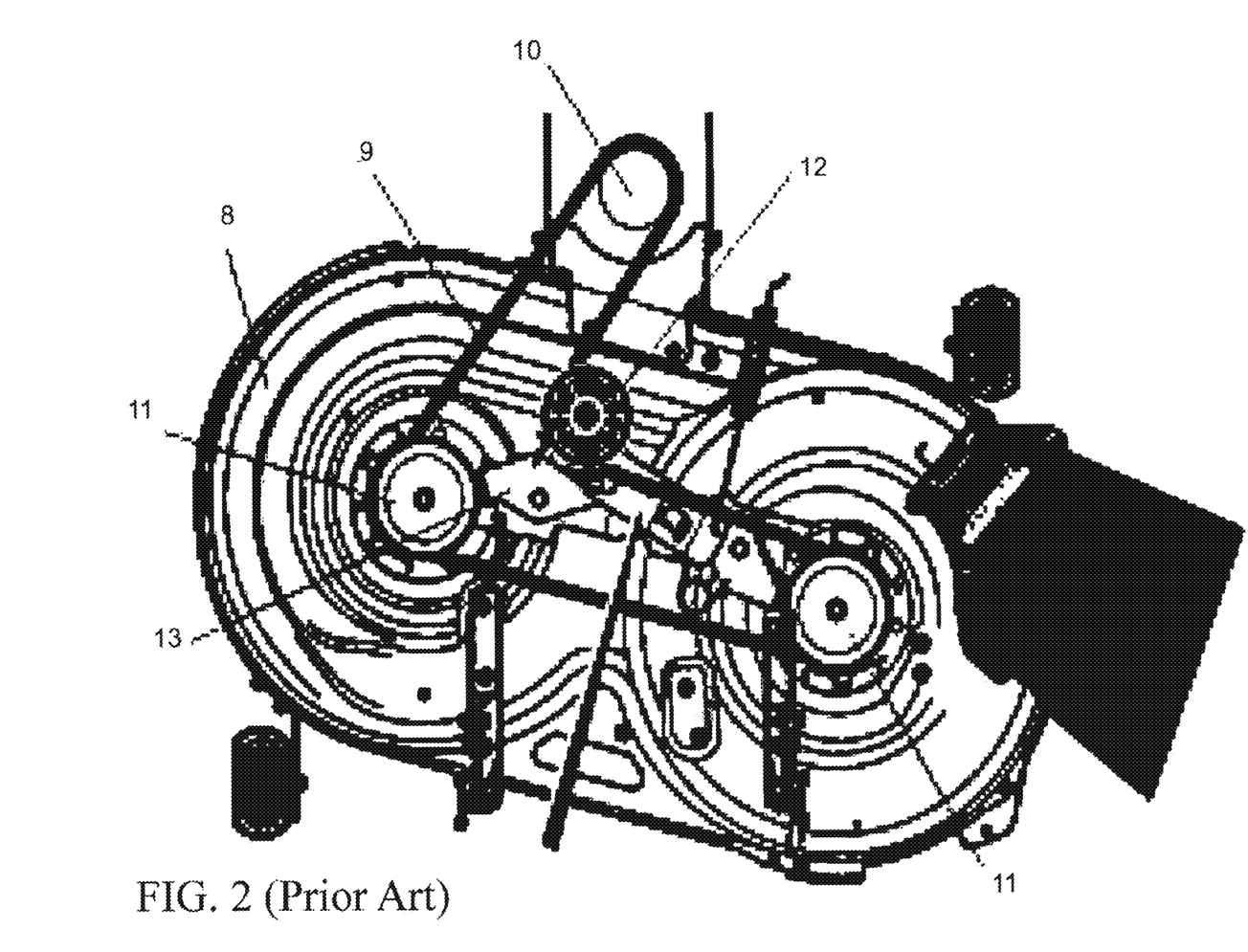
FIG. 2 is a perspective drawing of a typical prior art manual clutch.

FIG. 2 is a perspective drawing of a typical prior art manual clutch. As before, power for the tractor mowing deck 8 is transmitted from the tractor engine by a belt 9 drive system. The belt 9 is driven from a drive pulley 10 connected to the engine. The cutting blade pulleys 11 are connected to the cutting blades through a system of shafts and bearings. A belt idler tensioning pulley 12 is fixed to the movable tension idler pulley lever arm 13. The tension idler pulley lever arm 13 will be attached by a cable or rod to a user manually actuated lever to provide movement to the lever arm 13. In the disengage position the tensioning idler pulley 12 will move away from the belt 9 thereby releasing the tension causing the belt 9 to slip and the cutting blades to stop. When the manually operated lever is moved to the engage position the idler pulley 12 will contact the belt 9 and provide belt tension required to engage the belt 9 with the pulleys.

Again, there exist advantages and disadvantages to this manual configuration. The benefits of manual actuation are as follows:

with the manual actuation, electrical power to the clutch is not required to engage the cutting blades reducing the electrical demands on the tractor engine;
since tension is removed from the belt when the cutting blades are disengaged, the loading on the belt and bearings is reduced, leading to improved belt life and reliability;
the manual operation is much slower to engage the blades than the electromagnetic clutch so the loading of the belt and gasoline engine is much more gradual. This soft loading greatly reduces the potential to stall the engine and improves the life and reliability of the belt system.

The disadvantages of manual actuation are as follows:
the force needed to actuate the manually operated lever requires significant strength from the user to engage the tensioning pulley;
if the user does not fully engage the manually operated lever, proper belt tensioning may not be achieved, resulting in damage to the belt and pulley components;
the manually operated lever must be located in an area that the user can readily access from the cab area of the tractor which limits mounting options and creates design challenges;
the required mechanical linkages from the manually actuated lever to the cutting deck tensioning lever arm can be complex and prone to damage.

It would be greatly advantageous to provide an electromechanical Blade Clutch Actuator (BCA) that combines the advantages of both the manual and electromagnetic clutch actuation systems described above without the disadvantages.

SUMMARY OF THE INVENTION

It is, therefore, an object of the present invention to provide an electromechanical blade clutch actuator (BCA) with overload clutch protection for mowers that does not require continuous power when the deck blades are engaged, resulting in reduced electrical power demands from the engine and tractor.

It is another advantage to provide an electromechanical BCA that eliminates the manual force required to move the user lever as per the prior art manual system, thereby resulting in improved user experience and reduced physical demands on the operator.

It is another advantage to provide an electromechanical BCA that eliminates the constraints on where the operators actuating means (such as a lever or switch) can be located on the tractor. This provides greater freedom in tractor design since the BCA can be remotely mounted and actuated electrically.

It is another advantage to provide an electromechanical BCA where its actuation time can be controlled, thereby providing soft start benefits as with the manual system yet easier operation as with the electromagnetic clutch system.

It is another advantage to provide an electromechanical BCA with an over center pull design to remove stress from the actuator gear train when the mower blades are in the actuated position.

It is another advantage to provide an electromechanical BCA with an actuation cycle that provides a non-linear pull or movement of the cable connected to the idler pulley lever arm.

According to the present invention, the above-described and other objectives are accomplished with an electromechanical Blade Clutch Actuator (BCA) that uses an electric gear-motor system to drive an actuator arm rather than a manually operated actuator arm. This allows the user to operate an electrical switch to easily engage/disengage the cutting blades. The actuator can be remotely mounted from the switch, allowing for greater design freedom due to the removal of the need for a mechanical linkage. The present BCA operates in a similar fashion to the manual system in that it releases belt tension in the disengaged position but moves the idler pulley to tension the drive belt around the pulleys for the engage position.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

The present invention is an improved electromechanical Blade Clutch Actuator (BCA) that employs an electric gear motor system to provide more economical, convenient and reliable user control of an electric switch to engage/disengage the cutting blades. The user control may be a switch remotely mounted anywhere on the mower for greater design freedom due to the removal of the manual interface.

Figure 3:
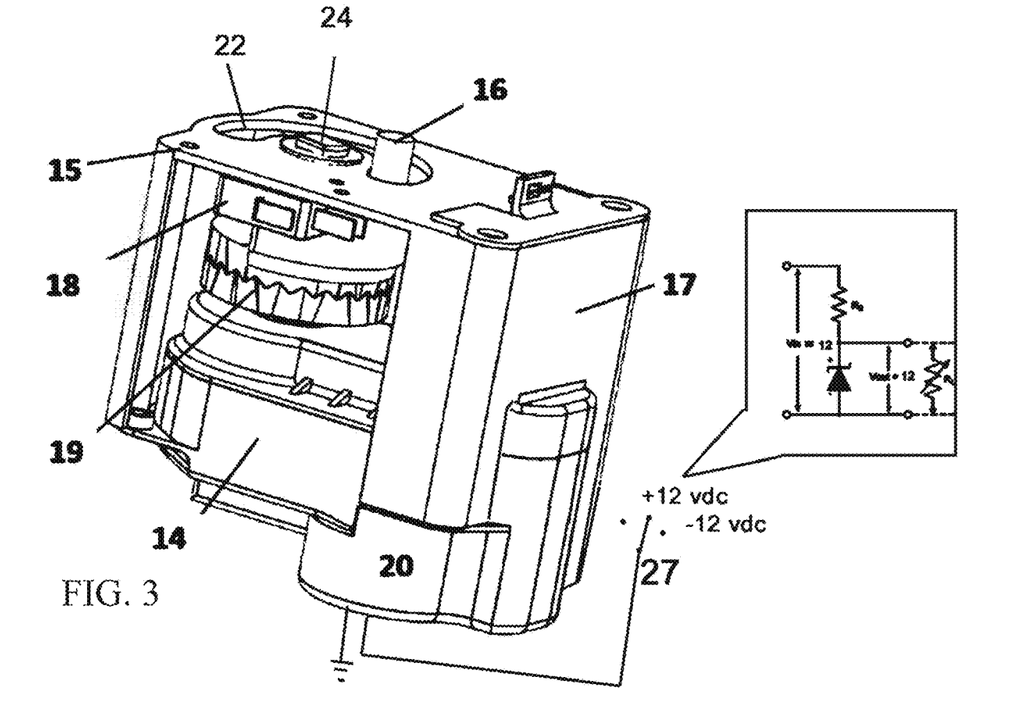
FIG. 3 is a perspective side cutaway view of the electromechanical Blade Clutch Actuator (BCA) according to an embodiment of the invention.
Figure 4:
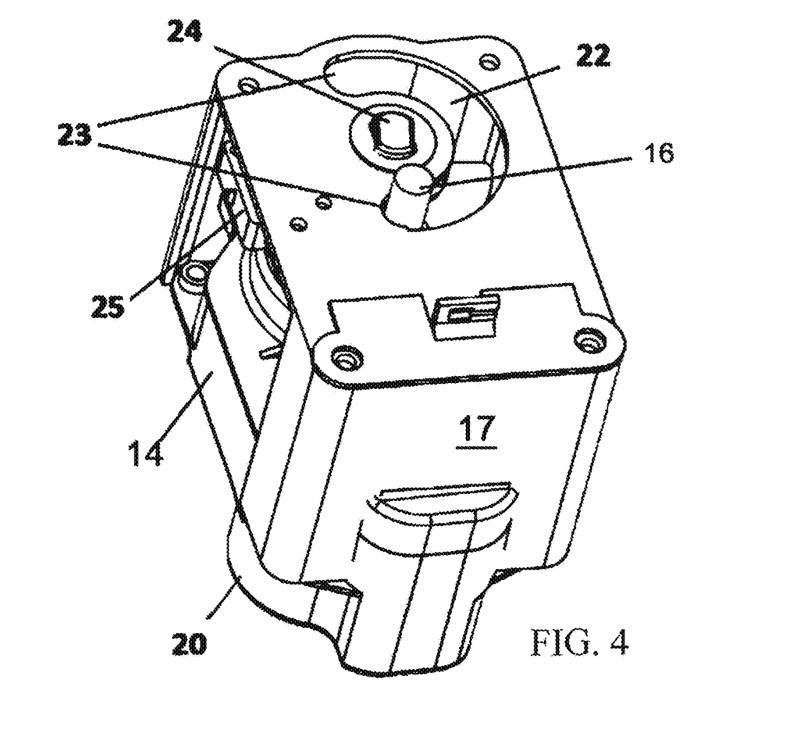
FIG. 4 is a perspective end cutaway view of the electromechanical BCA as in FIG. 3.

FIGS. 3 and 4 are opposite side cutaway views of the electromechanical BCA according to an embodiment of the invention. The BCA includes a housing 17 containing an internal motor 20 having an output shaft connected to a reduction gear train 14. The motor 14 may be any suitable DC motor, preferably a 12 VDC motor connected to derive power from the vehicle/tractor engine and 12 VDC battery mains. The motor 14 is selectively actuated by a remote user switch 27 shown schematically. When the remote user switch 27 is actuated the energized motor 20 turns gear train 14 which produces a rotational force at an output shaft 24, the shaft 24 being journaled into the housing 17. An offset camming post 16 is mounted eccentrically on the shaft 24, and the offset camming post 16 protrudes upward through a semi-circular slot in housing 17. The offset camming post 16 may be directly or indirectly coupled to a drive pulley 3 (see FIG. 1) for engaging or disengaging drive belt 2. The offset camming post 16 is free to rotate within the arcuate slot but when it encounters either end of the slot the camming post 16 will encounter and actuate one of two cycle limit switches 18, 25. Motor 20 is preferably a reversible 12 VDC electric motor, and switch 27 is preferably a three-position switch (open, +12 VDC, −12 VDC). Thus, motor 20 rotates in the direction corresponding to the switch 27 position until power is removed by the camming post 16 contacting a corresponding cycle limit switch 18, 25. At this point the cycle limit switch 18, 25 will open the actuator power circuit and stop the motor 20. One skilled in the art will readily understand that accurate positioning of the camming post 16 is required for accurate belt tensioning and safety. However, there may be variations in the mains voltage of the mower engine and battery condition (12-22 VDC) and so relying solely on the limit switches 18, 25 is not practical. This is why the camming post 16 is constrained to travel within track 22, the ends 23 of which serve as mechanical stops that limit the travel of post 16 to accurately position it at the desired position. In addition, due to variations in the gear box 14 output related to the voltage range applied to the motor 20, a mechanical overload slip clutch 19 described below is used to prevent damage to the mechanism under higher voltage conditions.

Figure 5:
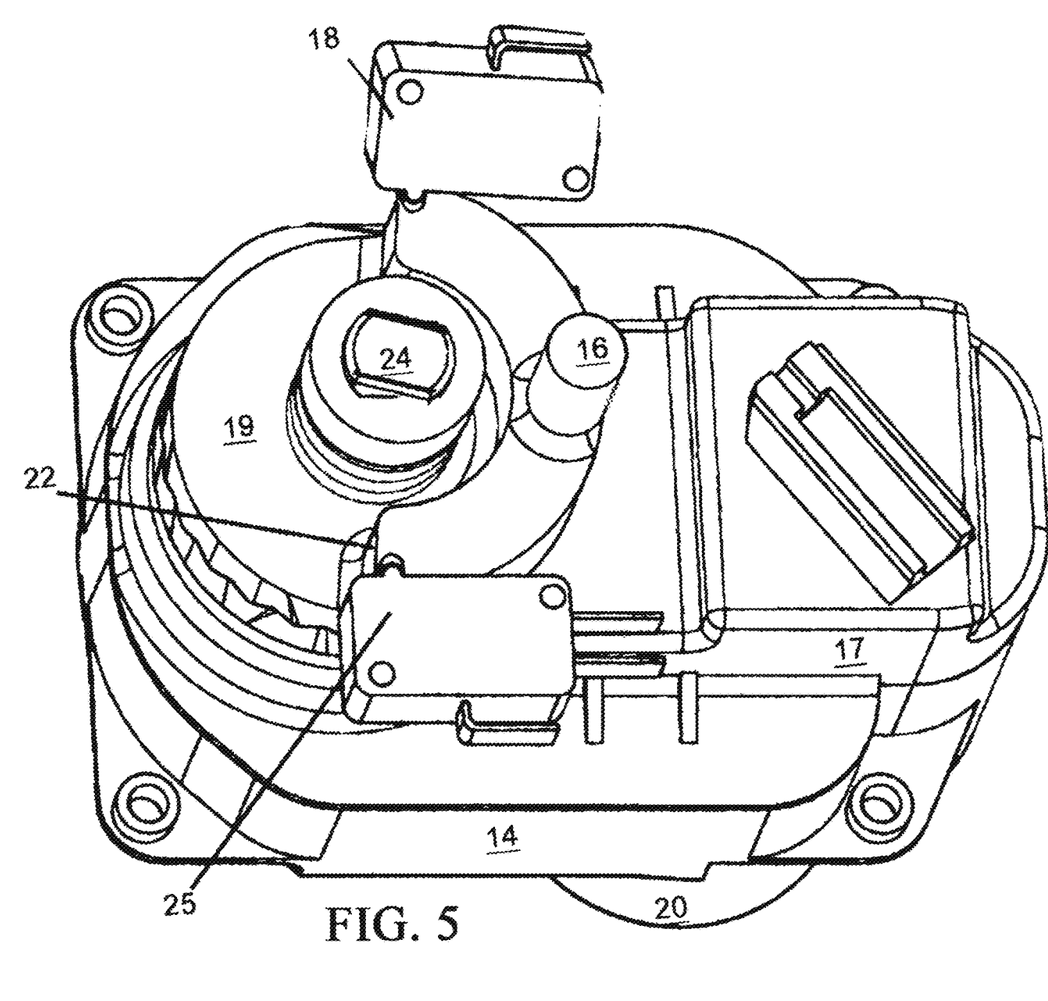
FIG. 5 is a top partial perspective view of the electromechanical BCA of the invention.

FIG. 5 is a top partial perspective view of the electromechanical BCA illustrating an exemplary configuration of the opposing limit switches 18, 25. Both limit switches 18, 25 may be conventional rocker-arm normally-closed switches used to mechanically detect the end of cycle of the camming post 16 and open the power circuit, thereby removing power from the motor 20. The limit switches 18, 25 trigger from contact with the camming post 16 at the ends of slot 22 to detect the end of cycle in the engage and disengage positions.

Figure 6:
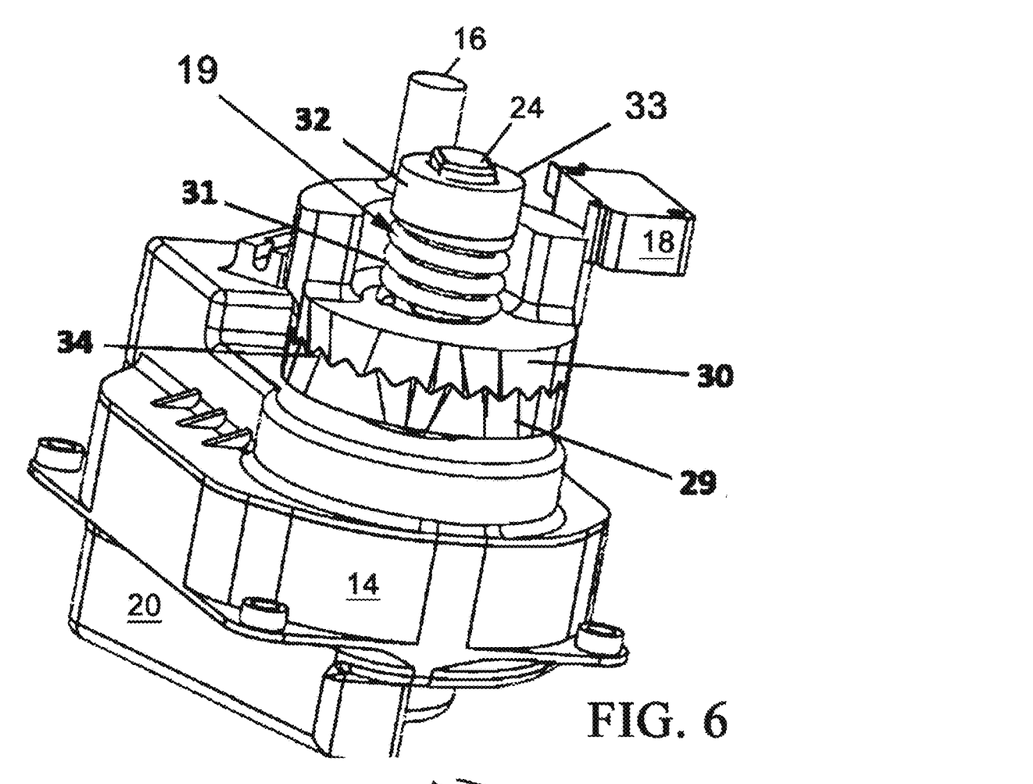
FIG. 6 is a front perspective view of the overload slip clutch 19 engaged.
Figure 7:
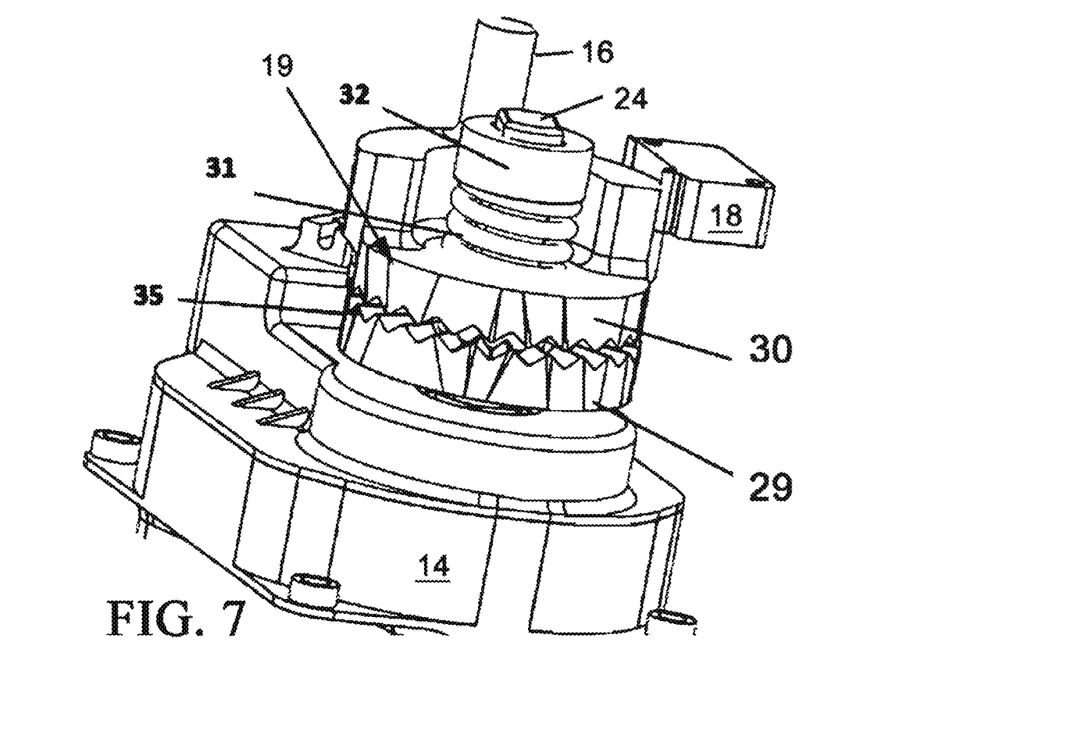
FIG. 7 is a front perspective view of the overload slip clutch 19 disengaged.

As indicated above an overload slip clutch 19 serves to limit the torque applied by the motor 20 and gear train 14 to the camming post 16. FIGS. 6 and 7 are front perspective views of the overload slip clutch 19. The slip clutch 19 interrupts the output shaft 24 of gear box 14 inside housing 17. The slip clutch 19 is comprised of two opposed gear wheels 29, 30 both having clutch faces formed with radially-oriented ramped gear teeth. The gear wheels 29, 30 mesh to transfer torque from the driving gear wheel 29 to the driven gear wheel 30 on the shaft 24. Pressure is applied to the clutch faces of gear wheels 29, 30 by a clutch spring 31 also mounted on shaft 24, the spring preferably being adjustable by set screw 32 to apply a pre-determined amount of compressive force to keep the gear wheels 29, 30 engaged. An axially-mounted clutch spring 31 maintains the faces of gear wheels 29, 30 in engagement to thereby transmit normal torque and rotate the shaft 24 and camming post 6 described above, but if a threshold amount of load is experienced the gear wheels 29, 30 disengage. The clutch spring 31 may be fixed to the output shaft 24 with a retainer 33. In operation, the set screw 32 and clutch spring 31 are calibrated such that a the desired threshold load condition overcomes the compressive force of spring 31 allowing the gear wheel 29, 30 faces to move apart in an axial direction 35 and disengage (FIG. 7), thereby limiting torque to the camming post 16. When the excess load condition is removed the clutch spring 31 force compels the gear wheels 29, 30 to re-engage (FIG. 6), enabling the slip clutch 19 to transmit torque.

One skilled in the art will appreciate that the slip clutch 19 might not be necessary and can be removed if the input voltage to the BCA is regulated. In this case the BCA motor 20 would be designed to achieve full performance at the lowest voltage output expected from the tractor, say 12 VDC. The electrical input to the BCA motor 20 would be fitted with a suitable voltage regulator, for instance a Zener diode-based circuit such as shown in the inset of FIG. 3, which limits the incoming voltage to the selected lowest voltage. The illustrated circuit also has a current-limiting portion, a resistor, to cap the maximum current the motor can see when the camming post 16 is driven to the hard stops 23 of notch 22 before the limit switches 18, 25 cut the power to the motor 20.

Figure 8:
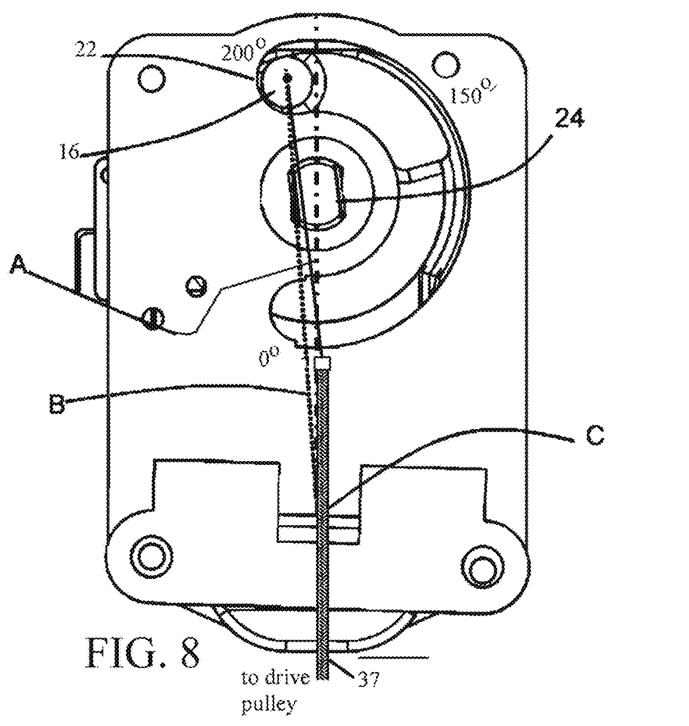
FIG. 8 is a top perspective view of the BCA of the invention.

FIG. 8 is a top perspective view of the electromechanical BCA illustrating the over-center pull design of the mechanism which removes stress from the actuator gear train 14 when the mower blades are in the actuated position. In this, the camming post 16 is indirectly coupled to drive pulley 3 (see FIG. 1) by a shifting cable example 37 for engaging or disengaging a drive belt 2. The shifting cable 37 and the actuator output shaft 24 are on the centerline A of the actuator. The camming post 16 will be driven past the center line A to the hard stop 23 of notch 22 along line B. With the camming post 16 past the center line A the force applied to the post 16 by the belt tensioning spring will be in the counter-clockwise direction, and the post 16 remains seated without further rotational power. Thus, the post 16 will contact and seat within the hard stop 22 at the end of travel, thereby relieving the load applied to the actuator gear train 14 and drive motor 20. This design will allow power to be switched off from motor 20 with the mowing blades nevertheless remaining in the ON cycle.

Figure 9:
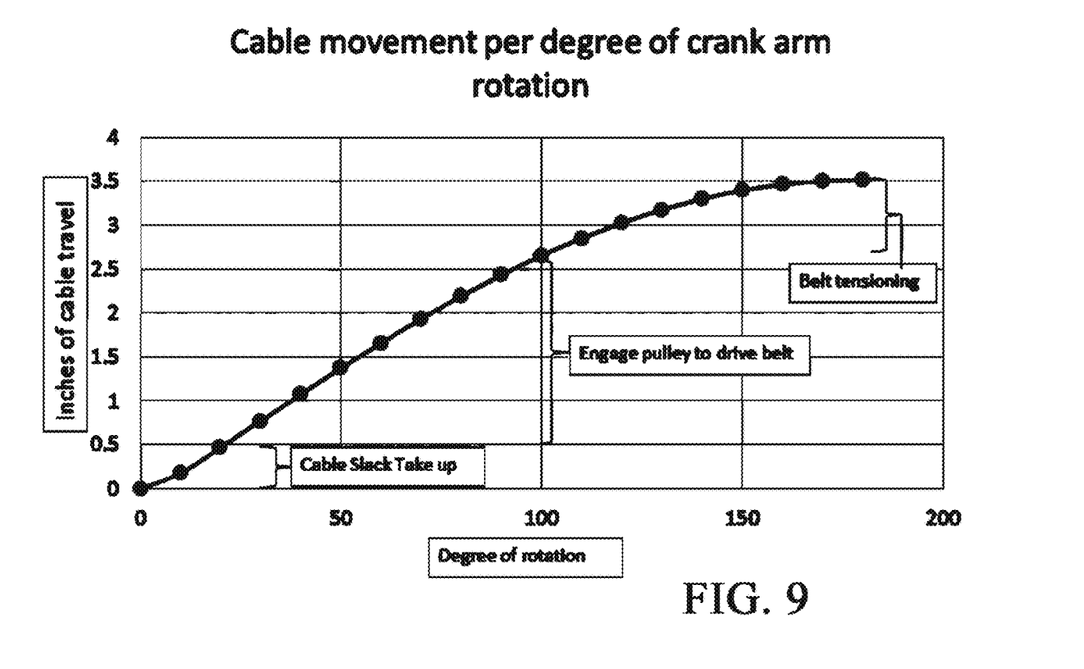
FIG. 9 is a graph illustrating inches of travel of a cable as a function of rotation of the camming post 16.

During the engagement of the cutting blades it is desirable to have a non-linear actuation cycle so that at the start of the blade clutch actuation the motor rotation quickly draws in the shifting cable 37 for engaging drive belt 2, then as the belt 2 begins to tighten the rate at which the cable 37 is drawn in slows down so that the belt 2 is gradually tensioned without potentially overstretching or breaking it (e.g., a "non-linear actuation cycle"). FIG. 9 is a graph illustrating inches of travel of the cable 37 as a function of rotation of the camming post 16. There are 3 stages to the actuation cycle; cable slack take-up, engaging the pulley with the belt 2, tensioning the belt 2 and extending the cable spring. Using the camming post 16 rather than a simple pulley design achieves the desired non-linear actuation cycle for the aforementioned three stages. Per the chart, from 0° to 150° of rotation the cable 37 slack take-up and the pulley engagement to the belt 2 stages are at the steepest portion of the non-linear curve for a fast and smooth engagement and starting of the cutting blades. From 150° to 200° of rotation the rate of change or slope between the cable 37 travel and the degrees of rotation drops significantly in the belt tensioning stage of the cycle for smoother operation and reduced wear on the tractor components.

The BCA described above is preferably coupled to camming post 16 via a damping spring (not shown), but in other embodiments of the invention it is envisioned that the BCA could be coupled to the idler tensioning idler pulley 12 by any other suitable form of mechanical linkage, such as a lever arm. It is also envisioned that the BCA could be directly attached to the idler tensioning pulley 12, swinging it in and out of contact with the belt 2.

Figure 10:
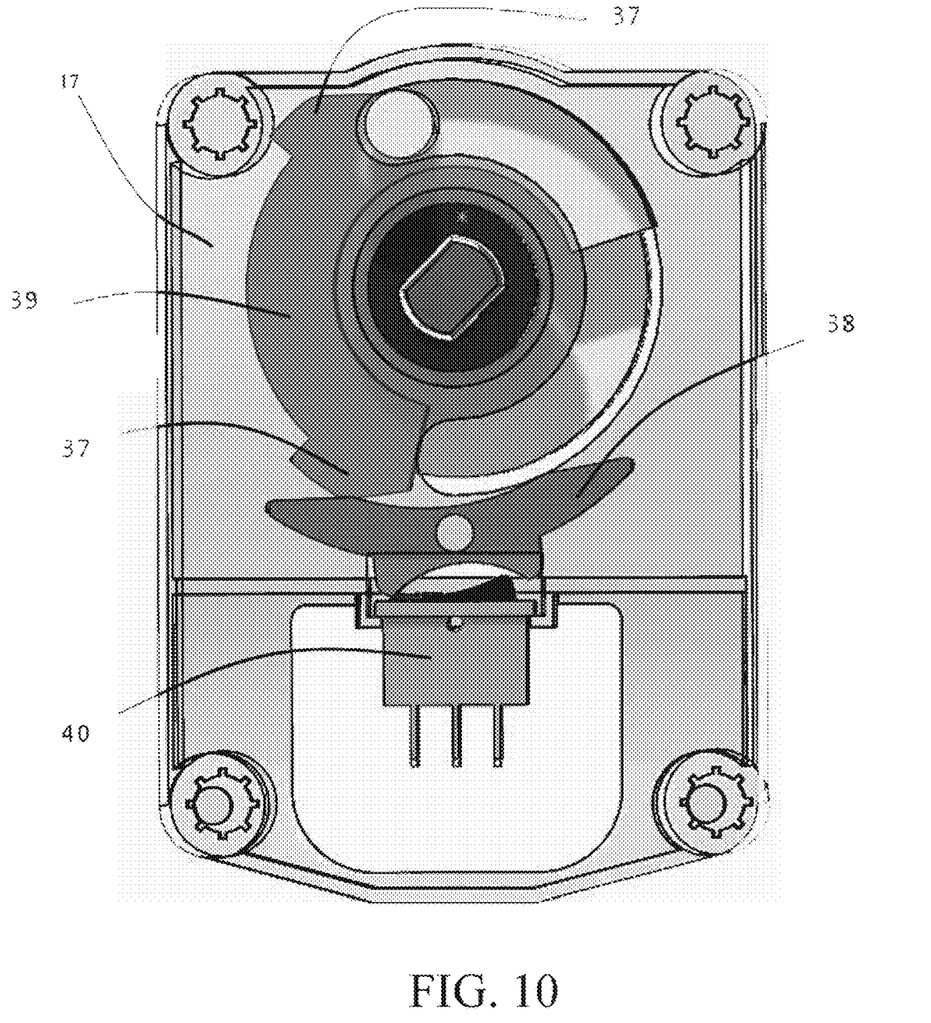
FIG. 10 is a perspective side view of the electromechanical Blade Clutch Actuator (BCA) with a single rocker-type limit switch 40 instead of individual limit switches 18, 25 according to an alternate embodiment of the invention.

As an alternative to individual limit switches 18, 25, it is possible to use a single rocker-type limit switch 40 as shown in FIG. 10. Rocker switch 40 is preferably, a double-pole double-throw (DPDT) rocker type switch configured to sense both ends of cycle to interrupt power to the motor 14 and stop the actuator shaft 24 rotation. In this instance the actuator housing 17 includes an internal space to mount a rocker switch 40 in a facing relationship with the offset camming post 16 and shaft 24. The rocker switch 40 includes a toggle lever 38 mounted on a fulcrum in the actuator housing 17 and operable to switch the rocker switch 40 one way or the other depending on the position of the camming post 16. The camming post 16 may, at each end of its cycle, bear directly against the respective sides of the toggle lever 38 and indirectly switch rocker switch 40 to thereby interrupt power to the motor 14 and stop the actuator shaft 24 rotation. The toggle lever 38 reduces the travel of camming post 16 needed to achieve the switching. Toggle lever 38 is itself a rocker arm pivotally mounted to the housing 17 in a facing relationship with the rocker switch 40 on one side, and facing the offset camming post 16/shaft 24 on the other side to convey movement from the camming post 16 at the ends of its cycle into an actuating force upon rocker switch 40. One skilled in the art will appreciate that the camming post 16 may be further adapted to reduce the necessary travel, such as by use of a camming extension 37 pivotally mounted about shaft 24 for translating motion of the camming post 16 at the top of its cycle into bearing force against rocker switch 40, thereby actuating the rocker switch 40 at both ends of the travel cycle with partial orbit of camming post 16, and interrupting power to the actuator drive motor 14 causing the actuator shaft 24 to stop in the desired position. Tripping of the rocker switch 40 at the end of cycle will also ready the switch 40 for the next, reversing cycle of the motor 14. The toggle lever 38 may be held in its tripped position for either cycle with a spring to keep it from moving due to vibrations of the tractor while the motor 14 and camming post 16 are between cycles. This use of a rocker or toggle type switch to demarcate both ends of reach cycle has advantages in that it avoids the need for a relay, thereby reducing part count, wiring challenges, and cost.

Figure 11:
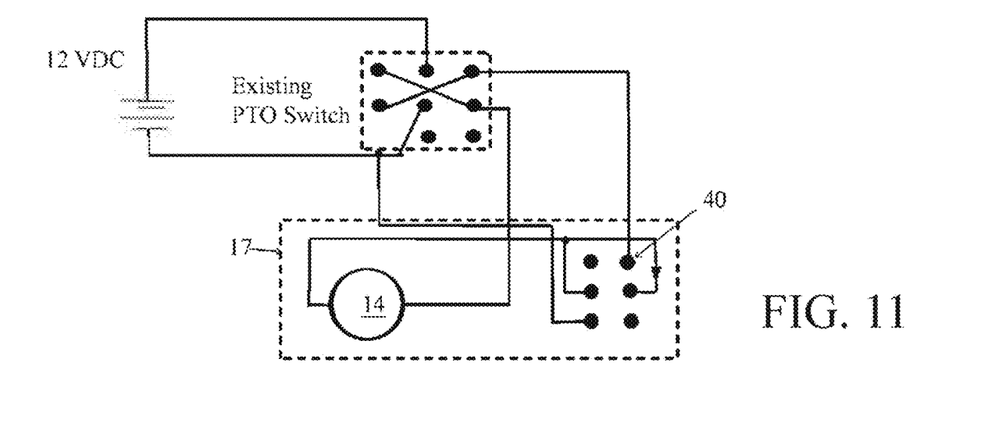
FIG. 11 is a schematic diagram of the wiring for the BCA with rocker-type limit switch 40 of FIG. 10.

FIG. 11 is a schematic diagram showing the basic wiring needed for the BCA with rocker-type limit switch 40 of FIG. 10. The existing power take-off (PTO) switch is wired as shown to the rocker-type limit switch 40 and diode DI prevents reverse-voltage application to motor 14.

Note that the foregoing lacks the ability to change motor 14 direction "Mid Cycle". Thus, for example, if an operator uses switch 40 to switch the blades "on" but then immediately switches "off" prior to the BCA described above completing the "on" engagement, the BCA will stop mid cycle. This could pose safety issues in that the operator request for the blade off condition is not met and the belts/blades would be partially engaged. The operator would need to cycle the existing PTO switch back to the on position and let the BCA actuator complete the on cycle, then turn the switch off for the actuator to cycle off.

Figure 12:
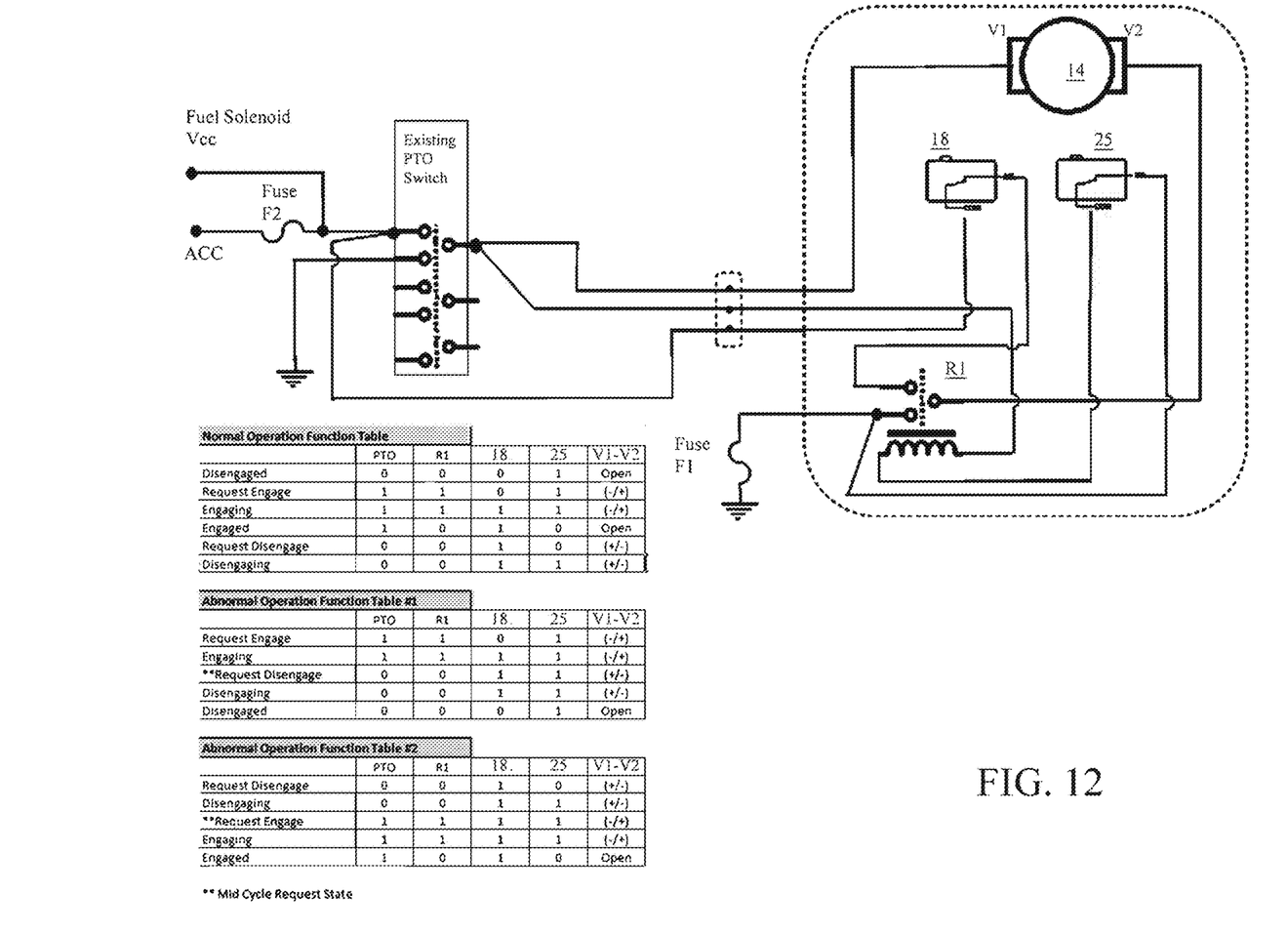
FIG. 12 is a schematic of a more elaborate yet preferred electrical system design that will meet the operator request at any point of the cycle.

FIG. 12 shows a more elaborate yet preferred electrical system design that will meet the operator request at any point of the cycle. In addition, the circuit of FIG. 12 allows separate over current (fuse) protection to the "cycle on" and "cycle off" circuits by fuses F1 and F2, thereby improving the safety and reliability of the BCA. The preferred electrical wiring also reduces the positions used on the existing PTO switch allowing potential cost savings. Switches 18, 25 (see also FIG. 5) sense the end of travel for the actuation cycle and are triggered by the mechanical movement of the camming post 16. R1 is a single pole magnetic latching relay wired both to switches 18, 25 which can request engagement and/or disengagement, respectively. Switch 18 is connected to R1 and to the PTO switch as shown and will sense the end of cycle for the blade off request. Switch 25 is connected to R1 as shown will sense the end of cycle for the blade on request. Relay R1 in conjunction with switches 18, 25 will reverse polarity to the actuator drive motor 14 to provide the actuation. The tables at the bottom of FIG. 12 illustrates the operation, as a function of the polarity at V1-V2, the position of the existing PTO switch, and the positions of 16, 25 and R1. The top table represents normal operation, the middle table shows abnormal operation where a disengage request is made before the end of cycle for a blade on request, and the lower table shows abnormal operation where an engage request is made before the end of cycle for a blade off request. The BCA does not start or stop mid cycle, thereby eliminating the above-described safety issues.

It should be apparent that the foregoing electromechanical Blade Clutch Actuator (BCA) for mowers results in a blade clutch with overload clutch protection that requires minimal user-force to actuate, yet does not require continuous power when the deck blades are engaged, resulting in decreased electrical power demands. The over-center pull design removes load from the actuator gear train when the mower blades are in the actuated position, and it will hold the blades in the actuated position even when power is removed from the BCA motor 20. The camming post design allows a non-linear pull or movement of the cable connected to the idler pulley lever arm. The hard stops in the actuator ensure precise positioning and cable tensioning while the integrated slip clutch prevents the actuator from being over-driven or damaged with the varying voltage supplied by the tractor. This has been a description of the present invention and, the preferred embodiment of the present invention, as well as various alternate embodiments of the present invention.

We claim:

1. An electromechanical Blade Clutch Actuator (BCA) for selectively moving an idler pulley between an engaged position and a disengaged position, comprising:
    a housing defining an enclosure and having a wall with an arcuate slot there through;
    a motor enclosed in said housing and having a drive shaft;
    a cam enclosed in said housing and comprising a hub coupled to the drive shaft of said motor and a camming post protruding from said hub, said camming post being radially offset from said drive shaft and protruding through the slot in said housing; said camming post being configured to be coupled to said idler pulley for selectively engagement and disengagement; and
    a first switch for removing power from said motor, said first switch having a switch actuator configured for engaging said cam when said camming post encounters an end of said arcuate slot to thereby provide coincident electrical and mechanical stop limits to said motor.

2. The BCA according to claim 1, wherein said motor is a reversible 12 VDC electric motor.

3. The BCA according to claim 1, wherein said first switch is a three-position switch having a switch actuator configured for engaging said cam at both ends of said semi-circular slot.

4. The BCA according to claim 1, further comprising a second switch having a switch actuator configured for engaging said cam when said camming post encounters an opposing end of said semi-circular slot to remove power to said motor.

5. The BCA according to claim 4, wherein said arcuate slot comprises at least a semi-circle.

6. The BCA according to claim 2, wherein said slot mechanically limits travel of said camming post.

7. The BCA according to claim 1, further comprising an overload slip clutch for mechanically limiting torque applied by said drive shaft to said cam.

8. The BCA according to claim 7, wherein said overload slip clutch comprises opposing gear wheels both formed with a radial array of ramped teeth spring-biased together.

9. The BCA according to claim 1, wherein said camming post is coupled to said idler pulley by a damping spring.

10. The BCA according to claim 1, wherein said camming post is coupled to said idler pulley by a lever arm.

11. The BCA according to claim 1, wherein said first switch comprises a single rocker-type double-pole double-throw (DPDT) switch having a pair of switch actuators each configured for engaging said cam when said camming post encounters a corresponding end of said semi-circular slot to remove power to said motor.

12. The BCA according to claim 11, wherein said single rocker-type switch includes a toggle lever mounted on a fulcrum in the housing.

13. The BCA according to claim 1, wherein said first switch is connected to a magnetic latching relay.

14. The BCA according to claim 11, wherein said DPDT first switch is connected to a magnetic latching relay.

15. A blade clutch actuator (BCA) for engaging and disengaging mower blades, comprising:
    a housing defining an enclosure and having a wall with an arcuate slot there through configured in at least a full semi-circle;
    an electric motor enclosed in said housing and having an output shaft;
    a reduction gear coupled to the motor output shaft, the reduction gear having an output shaft;
    a remote user-control for selectively actuating the motor;

a cam enclosed in said housing and comprising a hub mounted to the reduction gear output shaft, and an eccentric camming post protruding from the hub through the slot of said housing for travelling a defined arcuate path within said slot when said motor turns said reduction gear.

16. The BCA according to claim 15, wherein said motor is a reversible motor and said slot is defined by two end points that serve as mechanical stops for said camming post.

17. The BCA according to claim 15, further comprising at least one limit switch having a switch actuator configured for engaging said cam when said camming post encounters an end of said arcuate slot to remove power from said motor and thereby serve as an electrical stop for said camming post.

18. The BCA according to claim 15, further comprising a slip clutch mounted between said reduction gear and said camming post.

19. The BCA according to claim 18, wherein said slip clutch further comprises opposed spring-biased gear wheels.

20. The BCA according to claim 19, wherein said opposed spring-biased gear wheels both have radial ramped gear teeth.

21. The BCA according to claim 16, wherein said mechanical stops are over-center to seat said camming post without power from said motor.

22. The BCA according to claim 15, further comprising a cycle limit switch having a switch actuator configured for engaging said cam when said camming post encounters either end of said arcuate slot for removing power from said motor.

23. The BCA according to claim 18, wherein said overload slip clutch comprises opposing gear wheels both formed with a radial array of ramped teeth spring-biased together.

24. The BCA according to claim 22, wherein said cycle limit switch includes a toggle lever mounted on a fulcrum in the housing.

25. The BCA according to claim 24, wherein said cycle limit switch is connected to a magnetic latching relay.

* * * * *